(12) United States Patent
Earp et al.

(10) Patent No.: US 7,867,138 B2
(45) Date of Patent: Jan. 11, 2011

(54) METHOD OF CONTROLLING A VEHICLE TRANSMISSION

(75) Inventors: Leonard Earp, Wrexham (GB); David Allan Wozencraft, Oswestry (GB); Glyn Clifford Price, Mold (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 526 days.

(21) Appl. No.: 11/866,883

(22) Filed: Oct. 3, 2007

(65) Prior Publication Data

US 2009/0078070 A1 Mar. 26, 2009

(30) Foreign Application Priority Data

Oct. 3, 2006 (GB) .................................. 0619502.8

(51) Int. Cl.
*B60W 10/02* (2006.01)
*F16H 3/08* (2006.01)
(52) U.S. Cl. .......................................... 477/175; 74/331
(58) Field of Classification Search .................. 74/331, 74/336 R; 477/174, 175, 34; 192/3.51
See application file for complete search history.

(56) References Cited

U.S. PATENT DOCUMENTS

| 2,953,942 | A |   | 9/1960 | Schwartz et al. | |
| 2,972,901 | A |   | 2/1961 | Gerst | |
| 3,319,745 | A |   | 5/1967 | Hilpert | |
| 3,675,508 | A |   | 7/1972 | Blank | |
| 3,916,714 | A |   | 11/1975 | Sisson et al. | |
| 4,063,464 | A |   | 12/1977 | Crabb | |
| 4,627,302 | A |   | 12/1986 | Laylock et al. | |
| 4,658,663 | A | * | 4/1987 | Hiraiwa ........................ | 74/359 |
| 4,721,002 | A |   | 1/1988 | Horii | |
| 4,785,682 | A |   | 11/1988 | Nishimura et al. | |
| 4,877,116 | A |   | 10/1989 | Horsch | |
| 5,007,299 | A |   | 4/1991 | Bulgrien | |
| 5,125,282 | A | * | 6/1992 | Bender et al. .................. | 74/359 |
| 5,181,431 | A |   | 1/1993 | Zaiser | |
| 5,251,132 | A |   | 10/1993 | Bulgrien | |
| 5,259,260 | A | * | 11/1993 | Schneider ..................... | 74/331 |
| 5,392,665 | A | * | 2/1995 | Muller ......................... | 74/330 |
| 6,209,407 | B1 |   | 4/2001 | Heinzel et al. | |
| 6,250,171 | B1 |   | 6/2001 | Sperber et al. | |
| 6,491,604 | B1 |   | 12/2002 | Katou et al. | |
| 7,201,703 | B2 | * | 4/2007 | Ochi et al. .................... | 477/174 |
| 7,231,843 | B2 | * | 6/2007 | Gumpoltsberger et al. .... | 74/329 |
| 7,392,721 | B2 | * | 7/2008 | Pollak et al. .................. | 74/330 |
| 7,430,935 | B2 | * | 10/2008 | Ohnemus ...................... | 74/329 |

(Continued)

FOREIGN PATENT DOCUMENTS

DE 3410802 10/1984

(Continued)

*Primary Examiner*—Roger Pang
(74) *Attorney, Agent, or Firm*—Greenlee Sullivan PC (57) ABSTRACT

A method of controlling a vehicle transmission, the vehicle transmission including a power shift gearbox, the power shift gearbox having a power shift input shaft, a power shift output shaft, power shift input gearing and power shift output gearing, and a plurality of power shift clutches to drivingly connect the power shift input gearing and the power shift output gearing, and a master clutch operable to connect the power shift input shaft to a prime mover, the method comprising the steps of, disengaging the master clutch, and engaging at least two of the power shift clutches.

9 Claims, 5 Drawing Sheets

U.S. PATENT DOCUMENTS

2008/0053261 A1 3/2008 Wright
2008/0081738 A1 4/2008 Earp et al.

FOREIGN PATENT DOCUMENTS

| | | |
|---|---|---|
| DE | 10232837 | 2/2004 |
| EP | 0087681 | 9/1983 |
| EP | 0354890 | 2/1990 |
| GB | 1190972 | 5/1970 |
| GB | 2271821 | 4/1994 |
| GB | 0714320 | 8/2007 |
| WO | WO2004/076888 | 9/2004 |
| WO | WO2008/116562 | 10/2008 |

\* cited by examiner

METHOD OF CONTROLLING A VEHICLE TRANSMISSION

CROSS-REFERENCE TO RELATED APPLICATIONS

This application claims priority under 35 USC 119 (a)-(d) to United Kingdom Patent Application No. GB 0619502.8 filed on Oct. 3, 2006, which is incorporated by reference in its entirety herein.

BACKGROUND TO THE INVENTION

This invention relates a method of controlling a vehicle transmission. 'Vehicle transmission' here refers to a transmission to be interposed between a prime mover of the vehicle and ground engaging means of the vehicle which provides a plurality of gear ratios by which the ground-engaging means can be driven by the prime mover. The transmission has been devised primarily, but not exclusively, for a material handling vehicle, such as, for example, a tractor, loader type or similar vehicle for industrial and/or agricultural use, in which the ground engaging means typically comprises wheels but could also comprise crawler tracks.

Vehicles such as tractors or loaders have conventionally used transmissions which provide a range of forward gear ratios. It is a requirement of such transmissions that the vehicle needs to develop useful tractive effort over a wide range of speeds. For example, in bottom gear the vehicle may be designed to have a maximum speed of 1.5 kph and in top gear have a maximum speed of 65 kph, to permit the vehicle to operate at low speed whilst under load, but enable the vehicle to travel at an adequate speed when travelling along a road.

To provide a wide range of close ratios, it is known to provide a transmission having effectively a pair of gear boxes, a first gear box drivingly connected to the engine and providing a first range of ratios and a reverse gear, and a second gear box connected to the output of the first gear box and providing a plurality of selectable gear ranges. The output of the second gear box is then connected to the ground engaging means. Consequently, where the first gear box provides six gears and the second gear box provides four gear ranges, it will be apparent that there are 24 torque paths through the transmission. Advantageously, gear selection is performed by an electronic control unit which supplies fluid to power shift clutches or operates a solenoid to move synchromesh clutches in response to a gear shift demand from the operator.

To engage and disengage the transmission from driving connection to the prime mover, the transmission is further provided with a main clutch which is connected between an input from the prime mover, directly or indirectly, and an input shaft of the transmission. As the master clutch has to transmit a high torque, conventionally such clutches use large steel counter-plates and are filled with oil.

A disadvantage with such a main clutch is that, even if the clutch is disconnected, there will be some viscous drag due to the oil in the clutch which will transmit some torque through to the gearbox. If the gearbox is not in neutral, this can lead to the vehicle creeping forward and so will require the operator to hold the vehicle with the brake. It will be apparent that the clutches in the gearbox will be disconnected, but the transmitted torque from the master clutch will still drive the input gearing of the gearbox. Consequently, when the power shift clutches of the gearbox are engaged to select a gear and move off, the energy in the input gearing arising from the drag torque in the master clutch will cause a noticeably jerky start of the vehicle.

SUMMARY OF THE INVENTION

According to the first aspect of the invention we provide a method and control unit for controlling a vehicle transmission, the vehicle transmission including a power shift gearbox, the power shift gearbox having a power shift input shaft, a power shift output shaft, power shift input gearing and power shift output gearing, and a plurality of power shift clutches to drivingly connect the power shift input gearing and the power shift output gearing, and a master clutch operable to connect the power shift input shaft to a prime mover, the method may comprise the steps of disengaging the master clutch, and engaging at least two of the power shift clutches.

The method may include the step of detecting the speed of the vehicle and engaging the at least two power shift clutches when the vehicle speed may be below a threshold.

The plurality of power shift clutches may comprise a first plurality of power shift clutches operable to connect the power shift input gearing to an intermediate gearing and a second plurality of power shift clutches operable to connect the intermediate gearing to the power shift output gearing.

The step of engaging at least two of the power shift clutches may comprise operating at least two of the first plurality of power shift clutches.

The method may comprise the step of disengaging the second plurality of power shift clutches.

The method may alternatively comprise the steps of operating one or more of the second plurality of clutches, to provide a connection to a ground engaging means of the vehicle.

The method may comprise subsequently selecting a gear, operating a plurality of the power shift clutches to provide the selected gear, and engaging the master clutch.

The step of operating a plurality of the power shift clutches to provide the selected gear may comprise operating a required clutch of the second plurality of clutches in accordance with the selected gear, and subsequently operating the first plurality of power shift clutches to disengage the at least two power shift clutches and engage a power shift clutch in accordance with the selected gear.

The method may comprise detecting the position of an operator control and performing the method accordingly.

BRIEF DESCRIPTION OF DRAWINGS

An embodiment of the invention will now be described by way of example only with reference to the accompanying drawings.

DETAILED DESCRIPTION

Figure 1:
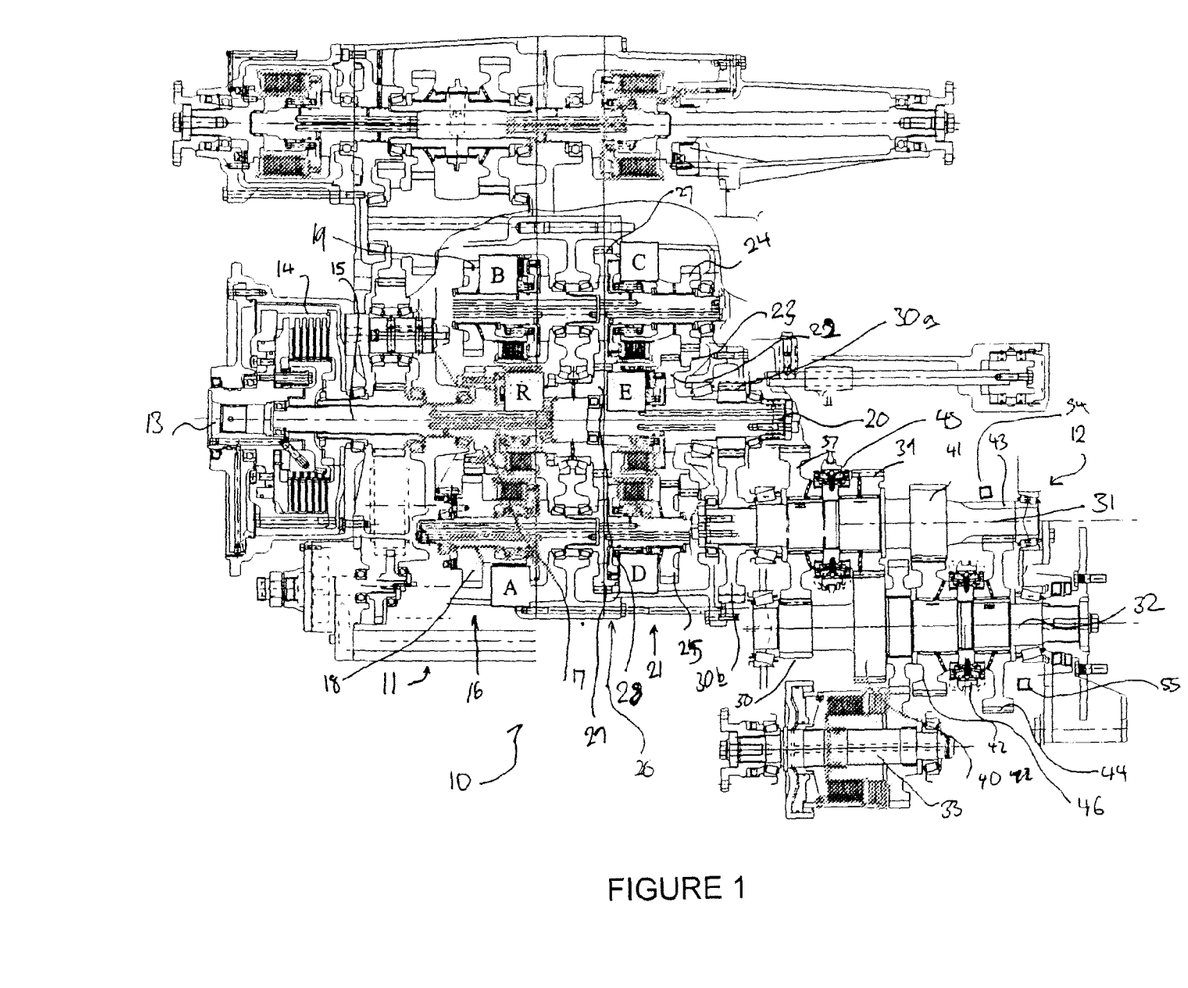
FIG. 1 is a sectional view of a transmission embodying the present invention.
Figure 2:
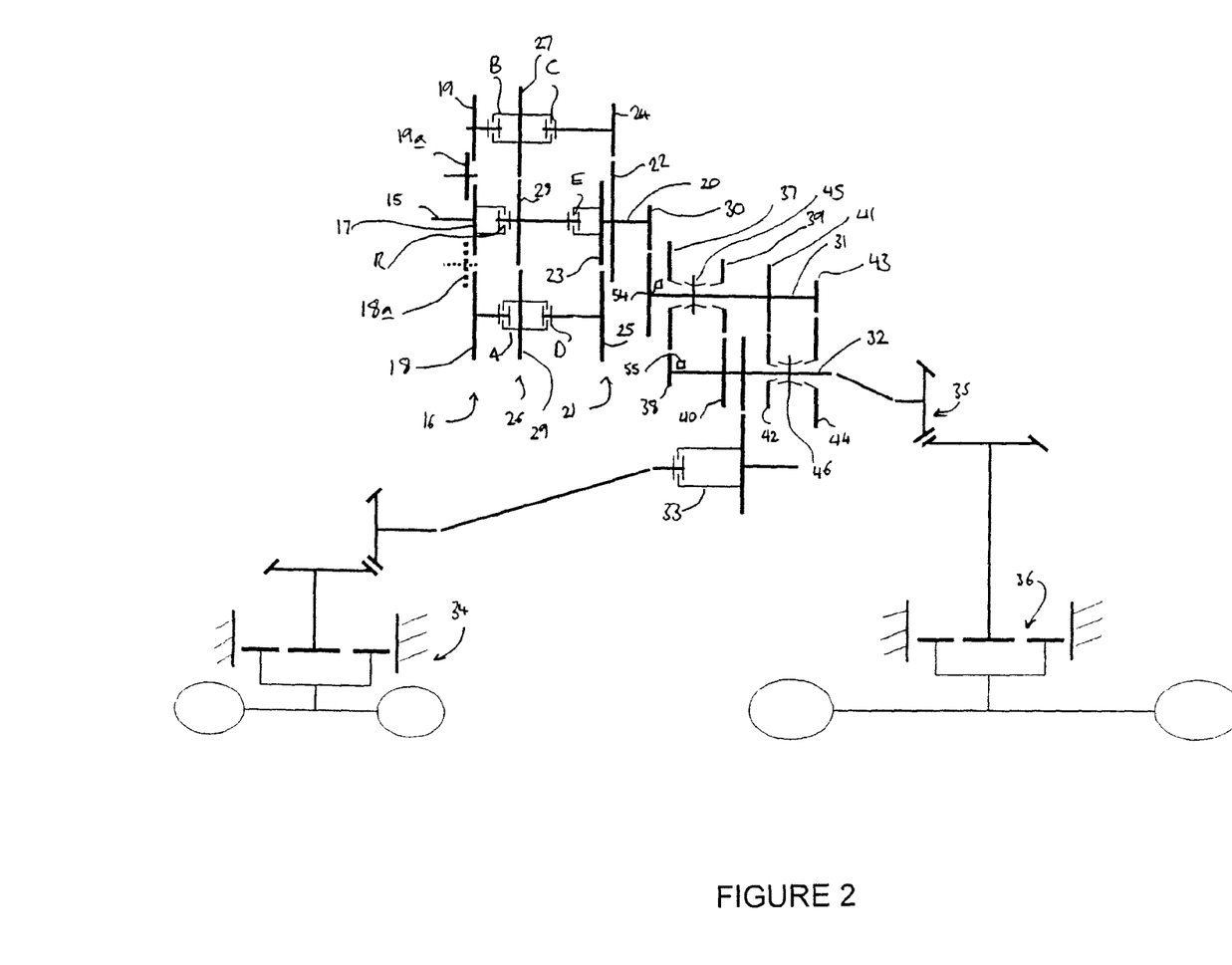
FIG. 2 is a diagrammatic illustration of the transmission of FIG. 1.

Referring now to FIGS. 1 and 2, a transmission embodying the present invention is generally shown at 10. The transmission 10 comprises a first power shift gearbox generally shown at 11 and a second range shift gear box generally shown at 12. The power shift gear box 11 has an input connection shown at 13 to receive drive from an engine or other prime mover. The engine input 13 is connected via a main clutch 14 to an input shaft 15 which drives input gearing generally shown at 16. The input gearing 16 comprises a main gear 17 supported on the input shaft 15, which drives a first input gear 18 and a second input gear 19 through idler wheels at 18a, 19a respectively on FIG. 2.

The power shift gear box 11 further comprises an output shaft 20 which in this example is co-axial with the input shaft 15. The power shift gearbox 11 has an output gearing as generally shown as 21 comprising a first output gear 22 and second output gear 23 mounted on the output shaft 20. The first output gear 22 is in mesh with third output gear 24 and second output gear 23 is in mesh with fourth output gear 25.

The power shift gear box 11 further comprises intermediate gearing shown at 26 comprising a first intermediate gear shown at 27, a second intermediate gear shown at 28 and a third intermediate gear shown at 29. The second intermediate gear 28 is in mesh with intermediate gears 27 and 29.

To provide torque paths through the power shift gear box, six power shift clutches are provided labelled A, B, C, D, E and R. Power shift clutch A is operable to provide a driving connection between the first input gear 18 and third intermediate gear 29; power shift clutch B is operable to provide a driving connection between second input gear 19 and first intermediate gear 27; power shift clutch C is operable to provide a driving connection between first intermediate gear 27 and the third output gear 24; power shift clutch D is operable to provide a driving connection between the third intermediate gear 29 and the fourth output gear 25; and power shift clutch E is operable to provide a driving connection between the second intermediate gear 28 and the output shaft 20.

Power shift clutch R is operable to provide a reverse gear, and is operable to connect the input shaft 15 to second intermediate gear 28.

Power shift clutches A, B and R provide a first plurality of clutches which are referred to as being on the "input side" of the first gear box 11 as they are operable to connect the input gearing 16 to the intermediate gearing 26. Power shift clutches C, D, and E provide a second plurality of the output clutches and are referred to as being on the "output side" of the first gear box 11 as they are operable to connect the output gearing 21 to the intermediate gearing 26. A torque path is provided by engaging one of the first plurality of power shift clutches and one of the second plurality of power shift clutches. Consequently, it will be apparent that there are nine torque paths through the first gear box 11, six forward gears and three reverse gears.

The output shaft 20 drives a power shift output gear 30a which supplies drive to the range shift gear box 12 through gear 30a.

The range shift gear box 12 comprises a range shift input shaft 31 driven through gear 30a and a range shift output shaft 32. The range shift output shaft 32 is connected via forward output gearing generally shown at 33 to provide front wheel drive to the front wheel axle assembly generally shown at 34, and is also connected through the rear output gearing generally shown at 35 to provide drive to a rear axle assembly generally shown at 36. The range shift gear box 12 comprises range shift gearing 137 to drivingly connect the range shift input shaft 31 and the range shift output shaft 32.

In this example, the range selection gearing 137 comprises four pairs of gears, one gear of each pair being mounted on the range shift input shaft 31 and the other on the range shift output shaft 32. To provide a high ratio, the first range shift input gear 30b is mounted on the range shift input shaft 31 and is in mesh with first range shift output gear 38 provided on the range shift output shaft 32. Similarly, to provide a medium gear ratio, second range shift input gear 39 is in mesh with second range shift output gear 40; third range shift input gear 41 is in mesh with third range shift output gear 42 to provide a low range; and fourth range shift input gear 43 is in mesh with fourth range shift output gear 44 to provide an extra load gear range. A first synchromesh clutch is provided as shown at 45 to selectively clutch one of first input range shift gear 37 and second range shift gear 39 to the range shift input shaft 31.

Second synchromesh clutch 46 is provided operable to clutch one of the third range shift output gear 42 and fourth range shift output gear 44 to the range shift output shaft 32. The first synchromesh clutch 45 and second synchromesh clutch 46 are interlocked such that only one of the clutches 45, 46 can be engaged at a time. Consequently, it will be apparent that there are four possible torque paths through the range shift gear box 12. Each path is selectable by operating one of the first synchromesh clutch 45 and the second synchromesh clutch 46, while the other of the first synchromesh clutch 45 or the second synchromesh clutch 46 is in neutral to provide the desired driving path. When operated the synchromesh clutches 45, 46 and powershift clutches may be 'dithered', that is the fluid pressure supplied to the powershift clutches or the electrical power sent to the synchromesh clutches may be varied slightly about the control level to avoid 'sticktion'.

Figure 3:
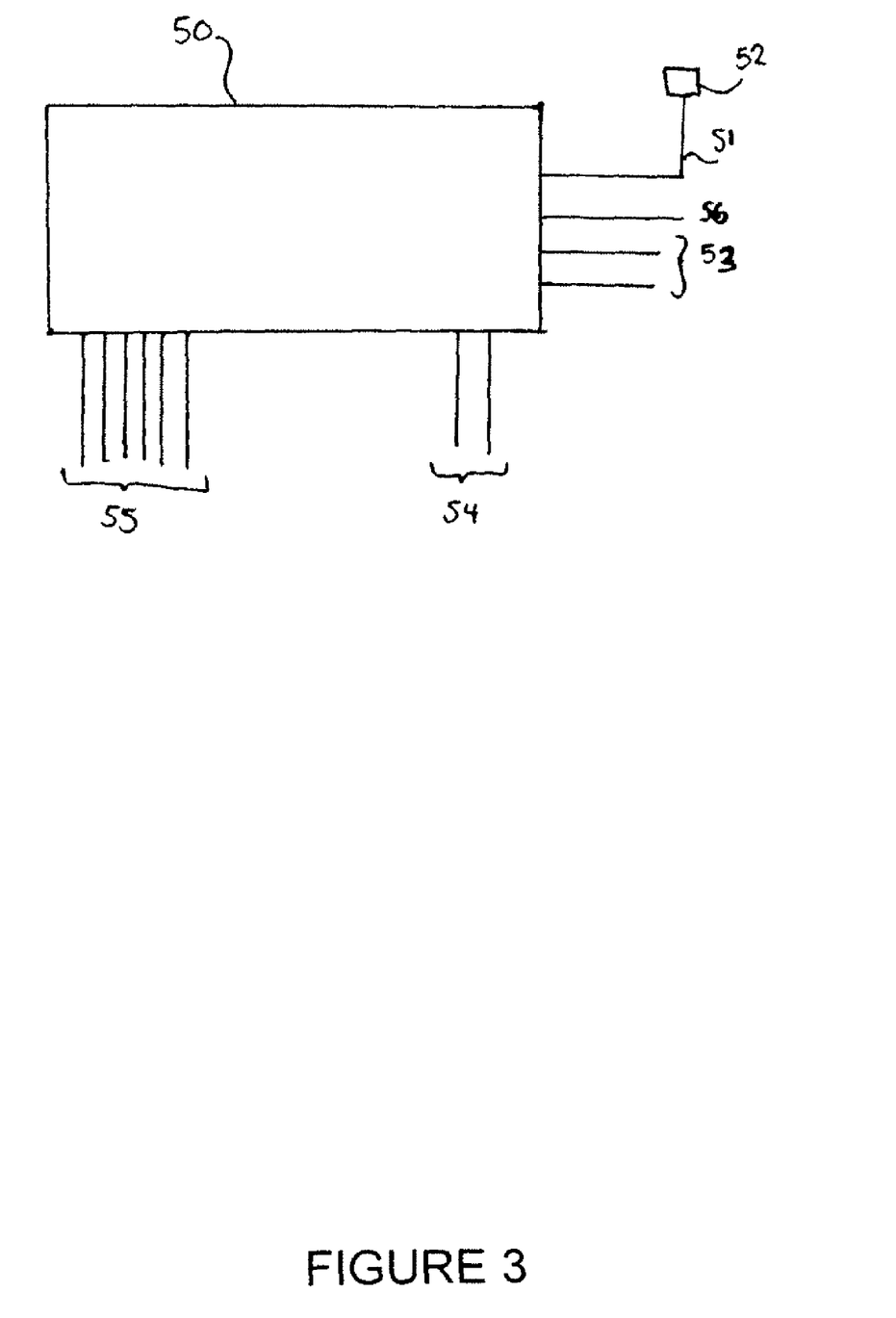
FIG. 3 is a diagrammatic illustration of an electronic control unit for use with the transmission in FIG. 1.

To control the transmission 10, an electronic control unit is provided as diagrammatically illustrated in FIG. 3. The control unit 50 receives input on line 51 from an operator control requesting a gear shift. The control unit 50 is also operable to receive signals on line 53 from sensors generally shown at 54, 55 in FIGS. 1 and 2 to measure the speed rotation of the range shift input shaft 31 and range shift output shaft 32. The controller is operable to control the synchromesh clutches 45, 46, as shown by lines 54, and to control the power shift clutches A, B, C, D, E, R as illustrated by lines 55. In general, the controller 50 is operable to receive an input from the operator control 52 and control the power shift clutches and synchromesh clutches accordingly to provide the next desired gear or torque path through the transmission 10.

The control unit 50 is also operable to receive a signal indicating the vehicle speed on a line 56, from any appropriate speed sensor as desired.

Figure 4A:
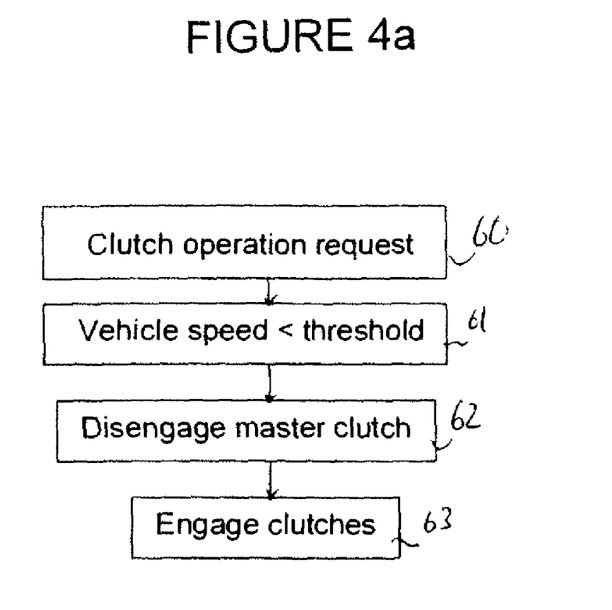
FIGS. 4a and 4b illustrate methods of operating the transmission of FIG. 1.
Figure 4B:
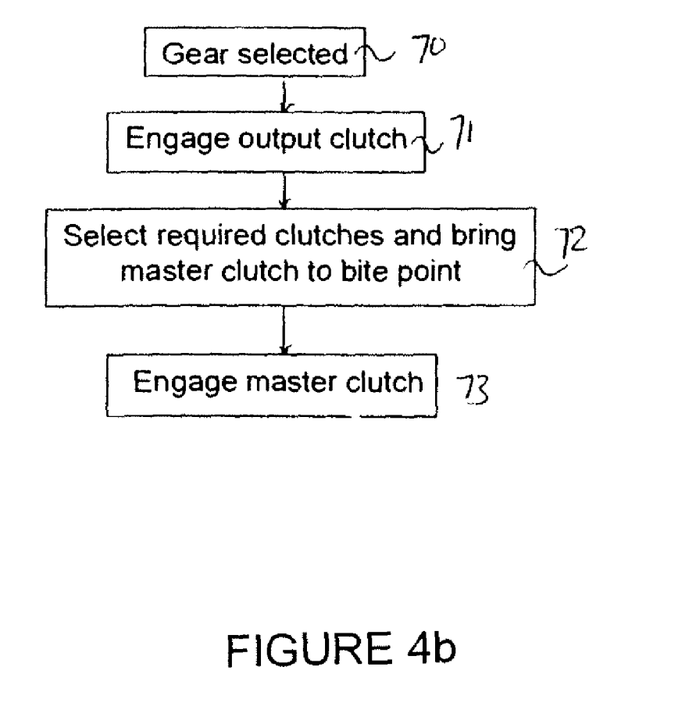

The controller 50 is operable to operate the transmission as shown in FIGS. 4a and 4b. At step 60, the control unit 50 detects operation of the operator control 52. The control 52 may for example be a clutch pedal which the operator may operate to require disconnection of the transmission from the prime mover, although it may be any other operator control or indeed an automatic sensor as required. At step 61, the control unit 50 checks that the vehicle speed is below a desired threshold, for example 1 km an hour, to prevent damage to the transmission. At step 62, the master clutch 14 is released, by controlling an appropriate proportional valve, and at step 63 a pair of power shift clutches on the input side of the first gearbox 11 are engaged. In the present example, the power shift clutches A and B are engaged, although it will be apparent that any other pair or indeed all three clutches on the input side of the first gearbox 11 may be engaged as desired. Whichever clutch pair is engaged, the intermeshing pair of gears in the input gearing 16 will be attempting to drive meshing pairs of the intermediate gearing 26 at different speeds. This will consequently act as a brake on the master clutch 14, and prevent drag torque within the master clutch 14 causing the input shaft 15 to rotate. Consequently, the input gearing 16 of the first gearbox 11 will occur. The output side of the power shift clutches C, D, E, are preferably disengaged to ensure that no torque will pass through the transmission 10, although one or more of clutches C, D, E may be engaged to provide a hill hold functionality as discussed in more detail below.

When it is desired to pull away, the control unit is operable as shown in FIG. 4b. At step 70, a gear is selected, for example as specified by an input from an operator control 52, or through the control unit 50 selecting an appropriate forward or reverse gear. At step 71, the appropriate power shift clutch C, D, E on the output side of the first gearbox 11 is selected. Subsequently, at step 72, the pair of power shift clutches A, B, R, which are not part of the desired torque path on the input side of the first gearbox 11 are disengaged, and the master clutch 14 brought up to the "bite" point, is such that it is just beginning to transmit torque. Finally, at step 73 the master clutch 14 is engaged to provide drive through the transmission 10 to the ground engaging elements and to allow the vehicle to pull away. Preferably, the operation of the master clutch 14 and powershift clutches A, B, R is timed such that torque is not applied through the master clutch 14 while the powershift clutches are locked but also that there is no delay in the master clutch being brought into engagement. Where the transmission comprises a second gear box 12 as in the present embodiment, at step 72 the appropriate range gear may be selected using synchro-mesh clutches 45 and 46.

As the power shift clutches A, B, R on the input side of the first gear box 11 have been operated to prevent any rotation of the input gearing while vehicle is stationary, there is no jerk or other transmission of energy as the appropriate gear is selected. When the master clutch 14 is engaged, the vehicle will then move off smoothly. It will be apparent that the control unit 50 may control the master clutch 14 and/or power shift clutches A, B, C, D, E, R to control how the vehicle moves away, to provide a desired smoothness or other acceleration characteristic.

Figure 5A:
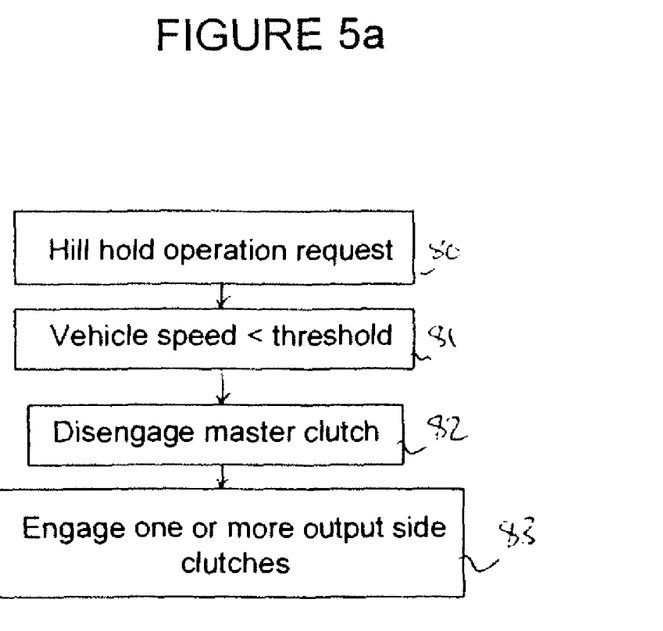
FIGS. 5a and 5b illustrate further methods of operating the transmission of FIG. 1.
Figure 5B:
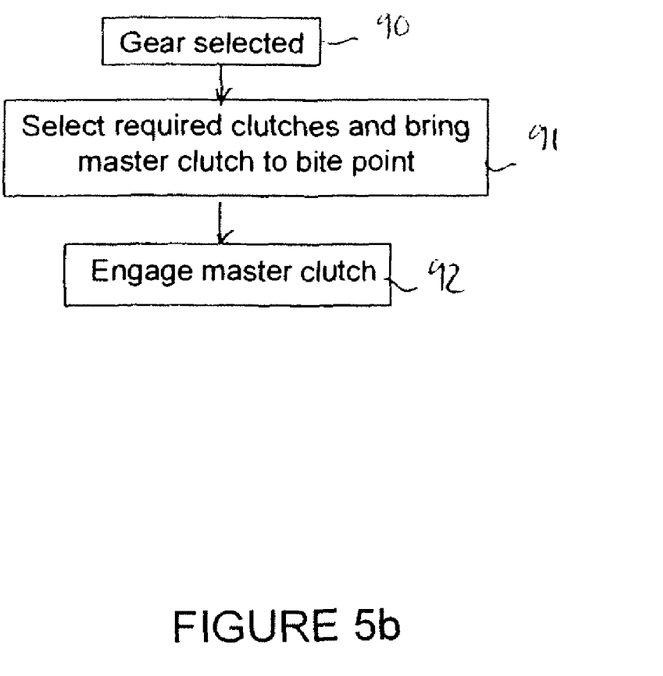

The transmission may also be operated to provide a hill hold function as illustrated at FIGS. 5a and 5b. At step 80, the hill hold operation request is received, for example by the operator operating a suitable control, or by a control unit receiving a signal indicating that the main clutch has been depressed and that the vehicle is located on a slope, or otherwise. At step 81, a control unit 50 checks that the vehicle speed is below a speed threshold to prevent damage to the transmission. At step 82 the master clutch is disengaged. At step 83, a plurality of clutches are engaged, including one or more clutches in the output side of the first gear box 11. The clutches to be operated may be selected as desired. For example, at least two of the clutches A, B, R of the input side of the first gearbox 11 and at least two power shift clutches C, D, E, on the output side of the gearbox 11 may be selected, or two or more of the input side clutches A, B may be engaged and one of the output side clutches C, D, E, or alternatively two or more of the output side clutches C, D, E may be engaged and one of the plurality of clutches A, B are on the input side of the first gearbox engaged. The gears may be selected to provide the appropriate braking effort necessary to hold the vehicle in a stationary position. To pull away as shown in FIG. 5b, the appropriate gear for pulling away may be selected as shown at stage 90. At step 91, the master clutch is brought up to bite point, and, when the controller 50 determines that sufficient torque has been generated to at least prevent roll back of the vehicle, the powershift clutches necessary to provide the desired gear are engaged. This may be performed by simply disengaging those of the powershift clutches A, B, C, D, E, R which have been engaged to provide the braking effort and which are not required to provide a torque path corresponding to the desired gear. At step 92, the master clutch 14 is fully engaged and the vehicle can pull away. This thus permits the vehicle to be held in a stationary position by simply appropriately controlling of the powershift clutches A, B, C, D, E, R and to provide a smooth pull away when required without requiring any additional components in the transmission and providing approved operator feel.

Although the embodiment described herein uses a two-part transmission 10 having a first gearbox 11 and the second gearbox 12, it will be apparent that the method of embodying the present invention and a control unit 50 operable to perform a method to be used in a transmission having only a single gearbox, such as that shown at 11, and with any appropriate number of clutches. Further, although the first gear box 11 shown herein has a set of input side clutches and a set of output side clutches to connect the input gearing, intermediate gearing and output gearing, the method embodied in the present invention may still be used with a gearbox which has only one "layer" of clutches for connecting input and output gearing; i.e. a gearbox without a layer of intermediate gearing. The transmissions may be locked by simply engaging two or more of the clutches and to pull away, the master clutch is brought up the bite point and all but the desired clutches may be released. Similarly, it might be envisaged that the application could be applied to a transmission with a plurality of layers of intermediate gears.

It will be apparent that the transmission described herein will also be operated in accordance with the method described in our co-pending application entitled "Method of Operating a Vehicle Transmission.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of controlling a vehicle transmission, the vehicle transmission having:
   a power shift gearbox,
   the power shift gearbox having a power shift input shaft, a power shift output shaft, power shift input gearing and power shift output gearing, and a plurality of power shift clutches to drivingly connect the power shift input gearing and the power shift output gearing, and
   a master clutch operable to connect the power shift input shaft to a prime mover,
   the plurality of power shift clutches comprising a first plurality of power shift clutches operable to connect the power shift input gearing to an intermediate gearing and a second plurality of power shift clutches operable to connect the intermediate gearing to the power shift output gearing, wherein a torque path is selected by engaging one of the first plurality of power shift clutches and one of the second plurality of power shift clutches,
   the method comprising the steps of:
   disengaging the master clutch, and
   simultaneously engaging at least two clutches of one of the first plurality of power shift clutches and the second plurality of power shift clutches.

2. A method according to claim 1 wherein the method includes the step of detecting the speed of the vehicle and engaging the at least two power shift clutches when the vehicle speed is below a threshold.

3. A method according to claim 1 wherein the step of engaging at least two of the power shift clutches comprises operating at least two of the first plurality of power shift clutches.

4. A method according to claim 3 comprising the step of disengaging the second plurality of power shift clutches.

5. A method according to claim 3 comprising the step of operating at least one of the second plurality of clutches to provide a connection to a ground engaging means of the vehicle.

6. A method according to claim 1 comprising subsequently selecting a gear, operating a plurality of the power shift clutches to provide the selected gear, and engaging the master clutch.

7. A method according to claim 6 wherein the plurality of power shift clutches comprises a first plurality of power shift clutches operable to connect the power shift input gearing to an intermediate gearing and a second plurality of power shift clutches operable to connect the intermediate gearing to the power shift output gearing, and wherein the step of operating a plurality of the power shift clutches to provide the selected gear comprises operating a required clutch of the second plurality of clutches in accordance with the selected gear, and subsequently operating the first plurality of power shift clutches to disengage the at least two power shift clutches and engage a power shift clutch in accordance with the selected gear.

8. A method according to claim 1 comprising detecting the position of an operator control and performing the method accordingly.

9. A control unit operable to control a vehicle transmission, the vehicle transmission having:
   a power shift gearbox,
   the power shift gearbox having a power shift input shaft, a power shift output shaft, power shift input gearing and power shift output gearing, and a plurality of power shift clutches to drivingly connect the power shift input gearing and the power shift output gearing, and
   a master clutch operable to connect the power shift input shaft to a prime mover,
   the plurality of power shift clutches comprising a first plurality of power shift clutches operable to connect the power shift input gearing to an intermediate gearing and a second plurality of power shift clutches operable to connect the intermediate gearing to the power shift output gearing, wherein a torque path is selected by engaging one of the first plurality of power shift clutches and one of the second plurality of power shift clutches,
   the control unit being operable to perform the steps of:
   disengaging the master clutch, and
   simultaneously engaging at least two clutches of one of the first plurality of power shift clutches and the second plurality of power shift clutches.

\* \* \* \* \*